March 12, 1957     C. BEATTY     2,784,446
MEANS FOR REMOVING MEAT FROM BONES
Filed June 16, 1955     2 Sheets-Sheet 1
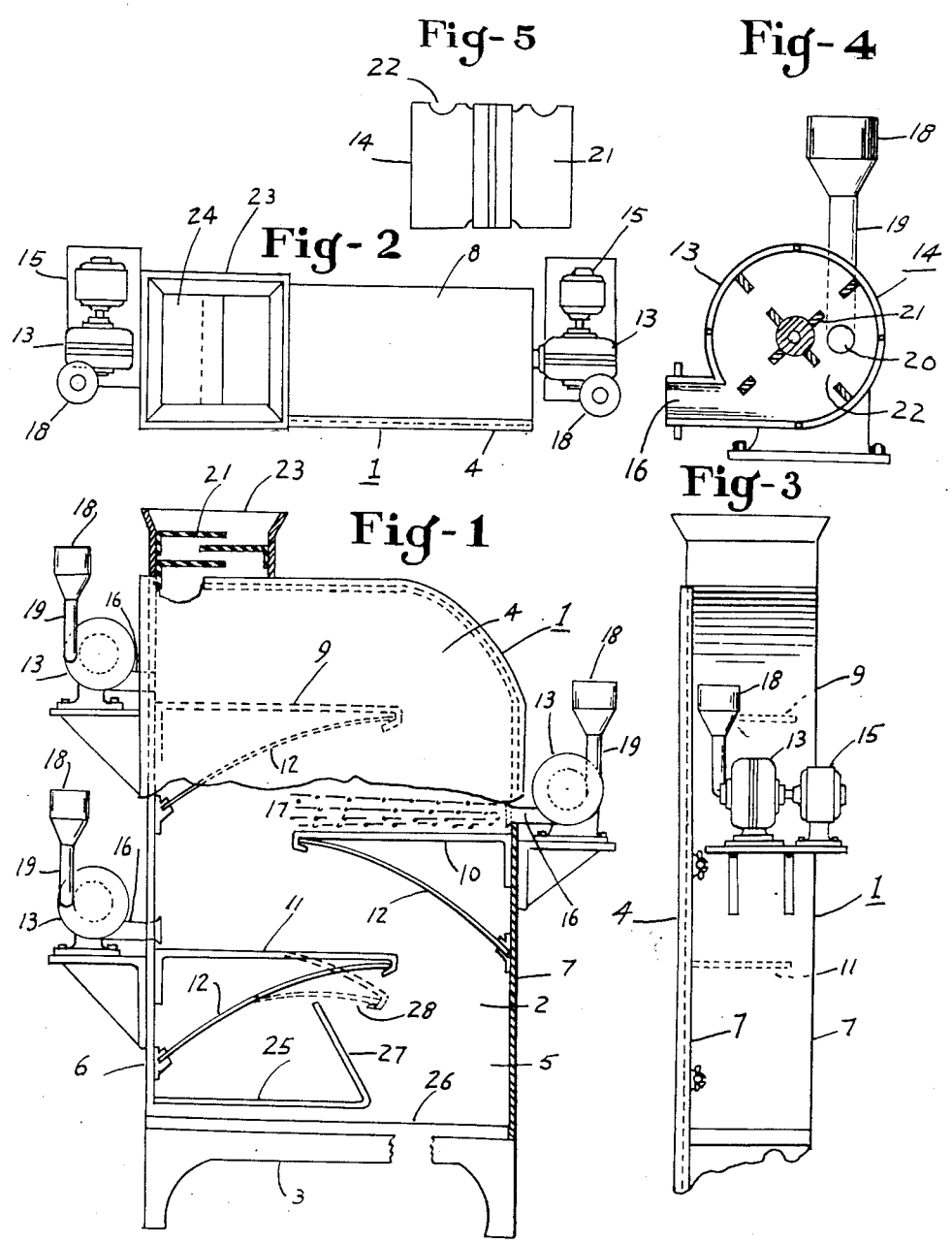
INVENTOR
CHESTER BEATTY
BY JAS R. SNYDER
ATTORNEY March 12, 1957  C. BEATTY  2,784,446
MEANS FOR REMOVING MEAT FROM BONES
Filed June 16, 1955  2 Sheets-Sheet 2

INVENTOR
CHESTER BEATTY
BY JAS R. SNYDER
ATTORNEY

United States Patent Office 2,784,446
Patented Mar. 12, 1957

2,784,446

MEANS FOR REMOVING MEAT FROM BONES

Chester Beatty, Monroeville, Pa.

Application June 16, 1955, Serial No. 515,921

1 Claim. (Cl. 17—1)

This invention relates to a method and means for cleanly removing meat from bones, by shot blasting operations.

In meat markets bones are discarded with more or less edible meat still on them which would be useable and marketable if it were removed from the bones. It is the common practice to cut the meat from the bones by hand. This is a slow and tedious operation involving an expense of labor usually greater than the value of the meat thus reclaimed.

The primary object of the invention is to provide a method and means of the character described, whereby the meat may be thoroughly, rapidly, and cleanly removed from the bones, thus making the operation of stripping clinging meat from the bones a profitable one.

Further objects and advantages of the invention are to provide a novel method for removing meat from bones by means of the class set forth, which is simple in its construction and arrangement, durable and efficient in its use, compact, and comparatively economical in its manufacture, operation, and maintenance.

With the foregoing and other objects in view which will be apparent from a study of the following description and of the drawings, wherein:

Figure 1 is a front elevational view of an apparatus for removing meat from bones constructed in accordance with the invention with portions of the apparatus being broken away and in section.

Figure 2 is a top plan view of the apparatus.

Figure 3 is a side elevational view thereof.

Figure 4 is an interior view of the propelling apparatus embodied in the invention.

Figure 5 is a plan view of the propeller.

Figures 6, 7, 8:
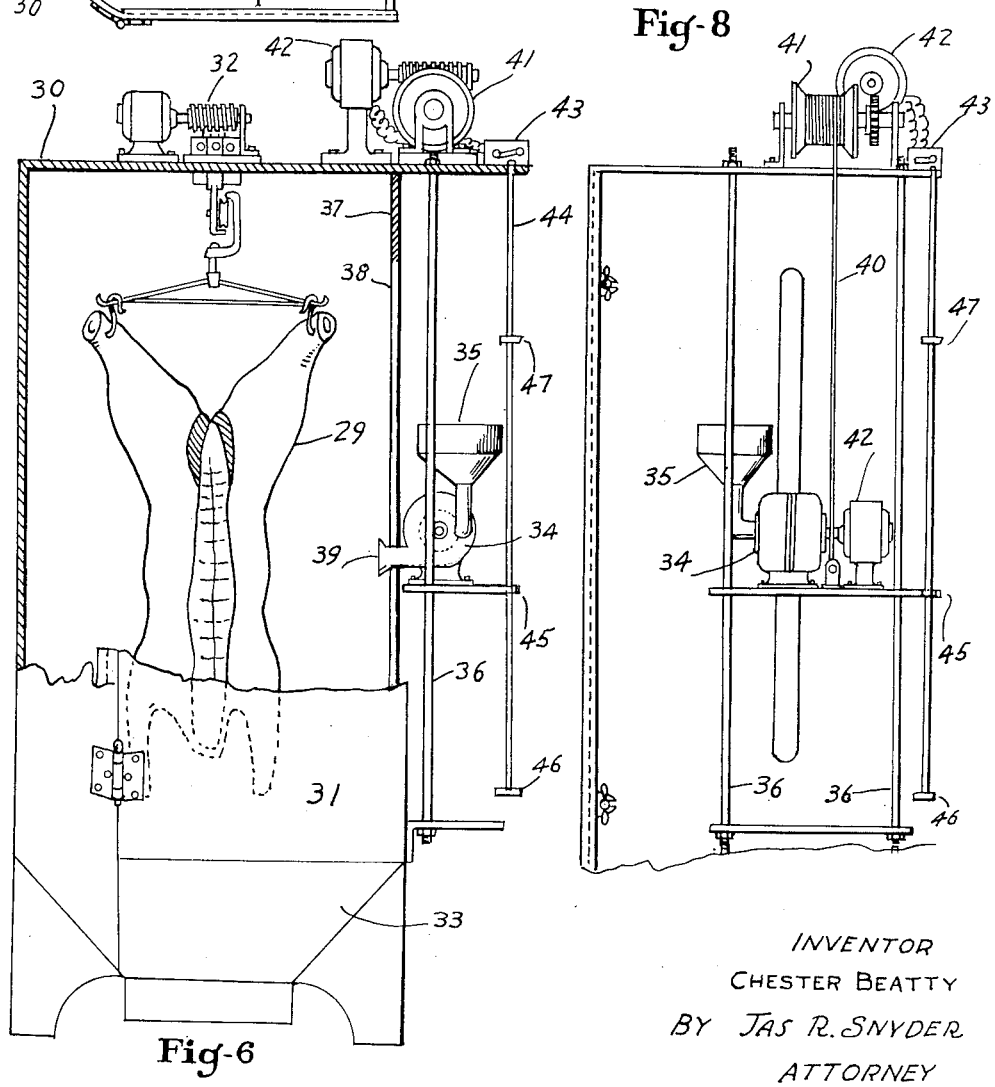
Figure 6 is a modified form of apparatus for removing meat from bones.
Figure 7 is a top plan view of the modified form of apparatus.
Figure 8 is a side elevation view of the modification.

Referring in detail to the drawings, the improved apparatus comprises a generally rectangularly-shaped casing 1, which is constructed to provide a comparatively shallow chamber 2. The casing is mounted on a suitable base 3 and consists of a removable front wall 4, a rear wall 5, and a pair of side walls, respectively indicated at 6 and 7, and a top 8. The casing is disposed vertically and may be constructed of any suitable material.

Three flat trays, respectively indicated at 9, 10 and 11, are mounted in the casing chamber 2 and are preferably constructed of comparatively resilient sheet material. The trays extend horizontally and are of widths conforming to the depth of the chamber 2. Each of the trays 9 and 11 has one end thereof permanently attached to the side wall 6 and has the free end thereof spaced a considerable distance from the side wall 7. The tray 10 is permanently attached to the side wall 7 and has the free end thereof likewise spaced from the side wall 6. The trays are disposed equi-distant from each other, with the tray 10 extending between the trays 9 and 11 to provide a staggered positional relation between the trays.

Each of the trays 9, 10 and 11, is provided with a curved directing plate 12 which is constructed of comparatively flexible, resilient sheet material, and which is of a width conforming to the width of the tray. The directing plates are removable and are disposed below respective trays. One end of the directing plate is connected with the free end of respective trays and the other end thereof is connected with respective side walls 6 and 7, as clearly illustrated in Figure 1.

Shot propelling mechanisms 13, each including a propeller 14 driven by an electric motor 15 and having a discharge barrel 16, are suitably supported on the outer face of respective side walls 6 and 7, with the discharge end of the barrels communicating with the casing chamber 2 at the attached ends of respective trays 9, 10, and 11, as shown in Figure 1.

Small steel shots 17 are fed into each of the propelling mechanisms 13 from a hopper 18 through a feed tube 19, which has the lower end thereof attached against one side of respective propelling mechanisms, preferably at a point disposed centrally outward on the latter, as indicated at 20.

Each propeller 14 comprises a plurality of radially disposed flat blades 21, each of which has one end thereof provided with a recess 22 for clearing the discharge end 20 of the feed tube 19, and thus allow the shots 17 to enter the propelling mechanism 13 while the propeller is rotating rapidly during bone cleaning operations in the manner to be described.

A meat hopper 23 is mounted on the casing top 8. The meat hopper is disposed adjacent to the side wall 6 and directly over the top tray 9. A plurality of flexible soft rubber baffles 24 are mounted within the meat hopper in staggered relation to each other to prevent the escape of any flying meat fragments through the meat hopper during bone cleaning operations.

The casing 1 is provided with a bottom section 25, which is disposed below the lower tray 11. One end of the bottom section is attached to the side wall 6, and the other end thereof is spaced from the side wall 7 to provide an opening 26 for the passage of the bones and meat after the cleaning or removing operations. The free end of the bottom section carries a directing flange 27, which is disposed upwardly at an angle from the vertical toward the side wall 6, and which is provided to direct the cleaned bones and meat through the discharge opening 26.

In practice, the operation of the described bone cleaning device is as follows: The shot hoppers 18 are filled with small shots 17 and the propelling mechanisms 17 are operated to rotate the propellers 14 at the required speed to forcibly eject the shots 17 through the discharge barrels 16 and across respective trays 9, 10, and 11.

The bones to be cleaned are dropped through the meat hopper 23 and will first land on the top tray 9 where they will be pelted by the shots 17 driven from the propelling mechanism associated with the top tray 9. The blasting action of the ejected shots will remove some of the meat from the bones and further, by driving action, will force the now partially cleaned bones from the tray 9 to the intermediate tray 10 through the spaced area between the free end of the tray 9 and the side wall 7. The above described operation is repeated as the bones are blasted on consecutive trays 10 and 11, and are finally discharged through the opening 26 at the bottom section 25 of the casing 1 to complete the bone cleaning operation.

The trays 9, 10, and 11, together with their respective directing plates 12, are sufficiently flexible and resilient to allow the free ends of the trays to flex downwardly, as indicated at 28, when the weight or mass of bones thereon is too great to be driven from the horizontally disposed trays by the blasting action of the shots 17, and thus will aid in moving the bones from one tray to the next by the blasting action.

The curved directing plates 12 will serve to direct the bones from one tray to the next, and will prevent, to a great extent, the removed meat from being driven against respective side walls 6 and 7 and against the under sides of the trays.

The removal of the front wall 4 will afford ready access to the casing chamber 2, which feature together with the removable directing plates 12 will allow the convenient cleaning of the interior of the casing 1 when required.

It will be noted that, while but three trays 9, 10, and 11 are embodied in the disclosed apparatus, it will be obvious that any required number of such trays may be provided to best product optimum bone cleaning operations.

It is, of course, apparent that when the meat is removed from the bones by the described blasting process, the shots 17 will be mixed or embedded in the removed meat. The separation of the shots from the meat may be accomplished by any suitable means and does not form part of the present invention.

The modified form of the invention, shown in Figures 6, 7, and 8, is designed for removing the meat from an entire animal carcass 29, and comprises a vertically disposed casing 39 provided with a large hinged front door 31. The carcass is suspended from the top of the casing 30 within the latter, and is slowly rotated during the meat removing operation, by means of a motor operated gear mechanism 32, which is mounted on the top of the casing 30. The lower portion of the casing 30 is formed to provide a tapered discharge member 33 for the passage of the meat as it is removed from the carcass.

A motor driven, shot propelling mechanism 34, including a shot hopper 35, and of the type herein before described, is mounted for vertical movement on a pair of vertically extending parallel disposed guide rods 36, which are fixed in position at the side member 37 of the casing 30. The side member 37 is provided with an elongated vertically extending slot 38 for the passage of the discharge barrel 39 of the shot propelling mechanism 34.

The shot propelling mechanism 34 is suspended on a cable 40. The cable is connected to a gear operated hoist 41, which is mounted on the top of the casing 30 and which is driven by a reversible motor 42.

A control switch 43 for the motor 42 is supported from the top of the casing 30, and is actuated by an elongated, vertically disposed rod 44 which is pivotally connected therewith and extends slidably through an apertured arm 45 that is fixed to the base of the shot propelling mechanism 34.

A lower collar 46 is fixed on the operating rod 44 below the arm 45, and a similar upper collar 47 is fixed on the operating rod below the arm. The distance between the collars determines the distance of alternate vertical travel of the shot propelling mechanism 34 during the meat removing operation.

In the operation of the modified form of the device, the operating shot propelling mechanism 34 moves automatically upward and downward alternately, while the discharge barrel 39 travels in the slot 38. When the arm 45 contacts with the upper collar 47 the operating rod 44 will shift upward to actuate the control switch 43 to reverse the motor 42 and thereby drive the hoist 41 in the direction to lower the shot propelling mechanism 34 on the guide rods 36. In like manner, when the arm contacts with the lower collar, the operating rod will shift downwardly to actuate the control switch to thereby drive the hoist 41 in the direction to again elevate or raise the shot propelling mechanism 34 on the guide rods. During the operation of the device the carcass is blasted continuously by pellets, preferably in the form of small steel shots, until all of the meat has been removed from the carcass.

The present invention provides a most efficient device of its kind, which may be economically constructed and successfully employed for the purposes herein set forth.

What I claim is:

An apparatus for removing meat from bones comprising, in combination, a vertically disposed casing including a removable front wall, a rear wall, and a pair of side walls, a plurality of resilient trays extending horizontally in said casing, said trays spaced from each other and being alternatively disposed in staggered positional relation to each other, each of said trays having one end attached to respective side walls and having the other end thereof spaced from respective side walls, a curved resilient directing plate removably mounted in said casing below each of said trays, a hopper for receiving and feeding the meat into said casing and embodying a plurality of soft rubber baffles, and a plurality of shot propelling mechanisms carried by respective side walls, each of said mechanisms including a shot discharge barrel extending into said casing at the attached end of respective trays, each of said mechanisms including a hopper for receiving and supplying the shot to respective mechanisms.

References Cited in the file of this patent

UNITED STATES PATENTS

| | | |
|---|---|---|
| 1,741,332 | Pearl | Dec. 31, 1929 |
| 2,523,302 | Hunt | Sept. 26, 1950 |
| 2,626,646 | Treat | Jan. 27, 1953 |
| 2,734,537 | Geisler | Feb. 14, 1956 |
| 2,734,540 | Geisler | Feb. 14, 1956 |